(12) United States Patent
Horan (10) Patent No.: US 7,677,270 B2
(45) Date of Patent: Mar. 16, 2010

(54) PLUG FOR A HYDRAULIC FITTING

(76) Inventor: Jody Horan, 15 Patrick Street, Aitkenvale, Townsville (AU) 4814

( * ) Notice: Subject to any disclaimer, the term of this patent is extended or adjusted under 35 U.S.C. 154(b) by 0 days.

(21) Appl. No.: 11/794,736

(22) PCT Filed: Jan. 19, 2006

(86) PCT No.: PCT/AU2006/000063
§ 371 (c)(1),
(2), (4) Date: Jul. 5, 2007

(87) PCT Pub. No.: WO2006/089346
PCT Pub. Date: Aug. 31, 2006

(65) Prior Publication Data
US 2008/0029176 A1    Feb. 7, 2008

(30) Foreign Application Priority Data
Jan. 21, 2005    (AU) .................. 2005900249

(51) Int. Cl.
*F16L 55/10* (2006.01)
(52) U.S. Cl. .............. 138/89; 138/96 T; 215/247; 215/307; 217/110
(58) Field of Classification Search ............ 138/89, 138/90, 96 R, 96 T; 215/355, 247; 220/801, 220/DIG. 19
See application file for complete search history.

(56) References Cited

U.S. PATENT DOCUMENTS

| 2,551,834 | A | * | 5/1951 | Ferguson | 138/96 T |
|---|---|---|---|---|---|
| 2,727,651 | A | * | 12/1955 | Mickelson | 220/792 |
| 3,792,794 | A | * | 2/1974 | Cutter et al. | 215/247 |
| 4,244,478 | A | * | 1/1981 | Handman | 215/249 |
| 4,441,621 | A | * | 4/1984 | Matukura et al. | 215/247 |
| 4,724,793 | A | * | 2/1988 | Sletten | 118/35 |
| 4,872,572 | A | * | 10/1989 | Schrooten | 215/307 |
| 4,893,636 | A | * | 1/1990 | Cook et al. | 600/577 |
| 4,968,197 | A | | 11/1990 | Chen | 411/34 |
| 5,064,083 | A | * | 11/1991 | Alexander et al. | 215/247 |
| 5,125,921 | A | * | 6/1992 | Duschek | 604/415 |
| 5,156,284 | A | * | 10/1992 | del Pilar Pla Rodriguez et al. | 215/11.6 |
| 5,224,515 | A | * | 7/1993 | Foster et al. | 138/89 |
| 5,232,109 | A | * | 8/1993 | Tirrell et al. | 215/247 |
| 5,333,837 | A | * | 8/1994 | Reese | 251/216 |
| 5,379,907 | A | * | 1/1995 | Niedospial et al. | 215/247 |

(Continued)

FOREIGN PATENT DOCUMENTS

DE    19813931 A1    9/1999

(Continued)

*Primary Examiner*—Patrick F Brinson
(74) *Attorney, Agent, or Firm*—Hoffman, Wasson & Gitler (57) ABSTRACT

A hydraulic or other type of high-pressure hose fitting can be temporarily sealed using a special type of plug. The plug is made of a rubber like material and can be used both as a male plug or a female plug. The plug contains a plug body with a tapered end portion that can be pushed into and seal against the tapered seat of a female hydraulic fitting. The plug also contains an internal open ended bore that can be pushed over a male fitting with the threads of the male fitting tightly pressing into the rubber material to form a seal and minimize the plug being blown off the fitting.

6 Claims, 7 Drawing Sheets

U.S. PATENT DOCUMENTS

| | | | | |
|---|---|---|---|---|
| 5,803,284 | A | * 9/1998 | Grimard | 215/249 |
| 5,819,964 | A | * 10/1998 | Grimard | 215/249 |
| 6,082,410 | A | 7/2000 | Pohar | 138/89 |
| 2002/0113033 | A1 | * 8/2002 | Claessens | 215/355 |

FOREIGN PATENT DOCUMENTS

| | | |
|---|---|---|
| DE | 10321544 A1 | 7/2004 |
| JP | 05196192 A * | 8/1993 |
| SU | 1710976 A1 * | 2/1992 |

* cited by examiner

PLUG FOR A HYDRAULIC FITTING

FIELD OF THE INVENTION

This invention is directed to a plug that can seal into the end of a hydraulic/pneumatic hose fitting, and where a single plug can be used on a number of different types of fittings. Thus, it is no longer necessary to have a large range of plugs depending on the type of hydraulic/pneumatic fitting.

BACKGROUND ART

Hydraulic hoses and pipes contain steel fittings to enable hoses to be coupled together, to be attached to another member (such as an outlet) and the like. These fittings can be broadly classed into male fittings and female fittings. The male fittings contain external threads and are designed to connect to female fittings. Conversely, the female fittings typically contain an internally threaded recess.

The recess in the female fittings typically contains an innermost sealing surface that may be flat or tapered. The internal threads are positioned between the sealing surface and the open end of the recess. This type of coupling is well-known. However, there is a large range of this type of coupling where the sealing surfaces are different, and the pitch of the thread is different.

Occasionally, it is necessary to plug an otherwise open fitting. However, it is common for the open fitting to leak hydraulic fluid, which can be quite toxic and corrosive. Even if the line has been drained of hydraulic fluid, there may still be an amount of fluid present in the line which can leak through the open fitting. Thus, a variety of plugs is known in the marketplace. It is known to provide a hard plastic threaded plug that screws into the female fitting. The plug contains a tapered nose that engages against the tapered sealing surface. A disadvantage with this arrangement is that a particular plug can only be used in a particular female fitting having the same thread pitch, and, as there is a large number of different types of fittings, a large number of different types of plugs is required. Another disadvantage is that any damage to the plastic thread of the plug can result in improper sealing and therefore the hydraulic fluid can leak past the plug which is highly undesirable.

It is also known to provide a simple push-in plug. The plug typically contains a small annular ring that can be pressed into one turn of the female thread to hold the plug in place. This type of plug is not very useful as it does not provide any sealing and therefore hydraulic fluid (especially if under some pressure) will easily leak past the plug.

It is also known to provide a snap-fit plug. This plug contains a larger annular rib and is designed to give a tight fit with only a single turn of the plug once the plug is pushed into position. An advantage of this arrangement (and with the push-in plug) is that is not very sensitive to the type of thread and therefore a single plug can be used for a number of threads. The disadvantage of this plug is the same as that of the push-in plug which is that it does not provide any meaningful seal against leakage of hydraulic fluid and the primary use of the plug is to protect the female thread against damage For male fittings, it is known to provide a threaded protection cap that can be threaded over the end of the male fitting. The disadvantage with this type of cap is similar to that of the hard plastic cap, in that different caps are required for different threads.

It could be argued that one possible solution would be to provide a plug having a soft wall that will cut its own thread when inserted into a female fitting. An advantage of this could be that the plug could be used on different types of threads. However, the disadvantage is that once the thread has been cut into the plug, the plug can then only be used on fittings that have that precise thread and therefore this does not really provide any meaningful solution to the above disadvantages. Also, the plug body would need to have quite a soft wall which might make it difficult to screw the plug in tightly into the recess.

Therefore, there would be an advantage if it were possible to provide some form of plug that could be used on different types of fittings and which is largely independent of the type of thread in the fitting, and which could also provide a useful degree of sealing (as opposed to just protecting the thread) to prevent leakage of hydraulic fluid when the plug is attached, and where the plug could be reused many times on different types of fittings and not just on the same fitting every time.

Another disadvantage with many of the existing plugs, and which has been described generally above, is the requirement to have many different sizes of plugs. Attempts have been made to reduce the number of plugs generally by having a "male" plug that is somewhat adaptable, and a "female" plug that is somewhat adaptable. There would be an advantage if it were possible to provide a plug that could be used both as a male plug and as a female plug.

It will be clearly understood that, if a prior art publication is referred to herein, this reference does not constitute an admission that the publication forms part of the common general knowledge in the art in Australia or in any other country.

OBJECT OF THE INVENTION

It is an object of the invention to provide a plug that may overcome at least some of the above-mentioned disadvantages or provide the consumer with a useful or commercial choice.

In a broad form, the invention resides in a plug to plug a hydraulic fitting, the plug comprising an elastomeric body that can be stretched or pushed over a male fitting or pushed into a female fitting.

In another form the invention comprises a plug adapted for insertion into a female hydraulic fitting and adapted to be fitted over a male hydraulic fitting, the plug comprising a head portion and an elastomeric body portion, the body portion being cylindrical and having an internal open ended bore which is also cylindrical, the open end of the body portion containing an external inwardly tapering sealing face adjacent the open end of the bore and an internal outwardly tapering portion.

In another form, the invention resides in a plug to plug a female hydraulic fitting, the female hydraulic fitting containing a recess, an internal thread inside the recess, and a sealing surface in the recess, the plug comprising an elastomeric body adapted to be pushed into the recess, the body being compressible and resilient such that when the body is pushed into the recess, it engages at least partially with the threads in the recess to hold the plug in place, the plug containing sealing means to engage against and to at least partially seal against the sealing surface in the recess.

Thus, by providing an elastomeric body, the plug can be pushed into a female fitting and it does not particularly matter what type or pitch of thread is in the female fitting as the body will conform to the particular thread and be engaged thereby. The body can be pushed far enough in to seal against the sealing surface in the recess. Also, when removed, the plug does not have a formed thread and therefore can be reused many times on different types of fittings.

Therefore, the plug according to the present invention can function to protect the threads of the hydraulic fitting, as well as sealing against leakage of hydraulic fluid, and the engagement of the plug against the threads can be sufficient to enable some pressure in the line to be accommodated without the plug being blown out of the fitting.

In another form, the invention resides in a plug for a male fitting, the plug comprising a recess adapted to extend over the male fitting, the plug comprising a stretchable material to enable the plug to be stretched over the male fitting and then snugly engaged against threads of the male fitting. In this form of the invention, the recess may be provided with sealing means. Again, the material does not have a formed thread, and a thread is not cut into the material when the plug is fitted to the male fitting, and therefore the plug can be used many times on different types of fittings.

The plug may be of any size and shape to suit the particular fitting. The fitting may comprise a hydraulic fitting, a pneumatic fitting or even any other type of fittings where it is considered useful to use the plug which forms part of the present invention.

Typically, but without limitation, the plug will have a length of between 10-100 millimetres and a width of between 5-50 millimetres.

In one form of the invention, the plug has a body that is adapted to be pushed into a female fitting. The body will typically have a width/diameter which is slightly larger than the internal width/diameter of the fitting such that the body will be slightly compressed as it is pushed into the fitting.

The plug may be provided with means to facilitate insertion or turning and removal of the plug from the fitting. The means may comprise a hand grippable portion such as a nut configuration, although no particular limitation should be placed on the means merely by exemplification of this particular configuration. For instance, the means may comprise a wing nut, a projection, a handle, a lever, a knob and the like.

The plug, and especially the body, may be made from a single material, a blend of materials, composite materials, and the like. In a particularly preferred embodiment, the body is made from a rubber-like material such as "nitrile", which is elastomeric but also relatively resistant to the corrosive effects of hydraulic fluid. It is envisaged that the body may be made from other rubber-like materials such as neoprene, treated rubbers (e.g. vulcanisation or crosslinking), homopolymers, copolymers, blended polymers, block polymers, nitriles, and the like. The material may contain strengthening agents, reinforcement, fillers, and the like.

The body may comprise an inner core made of one material and an outer layer made of the elastomeric material.

The body may be solid, hollow, may contain weight reducing voids, or may have any other type of internal configuration to facilitate the elastomeric properties of the body.

The body may have a head portion and a tail portion, with the tail portion typically containing the hand grippable means. The head portion will typically be that part that is inserted into the female recess. The head portion may be configured to facilitate sealing into the recess. The configuration may comprise an annular sealing surface. The annular sealing surface may form part of an annular ring or similar that can be bent, moved or otherwise manipulated to improve the sealing engagement in the recess.

It is especially preferred to provide a plug that could be used both as a male plug and as a female plug and in respect of a variety of fitting sizes. Although it would probably not be possible to have a single plug for all fitting sizes, an advantage of the present invention is that a relatively low number of plugs can be used for a very large number of fittings.

BRIEF DESCRIPTION OF THE DRAWINGS

Embodiments of the invention will be described with reference to the following drawings in which.

BEST MODE

Referring initially to the embodiment of the invention illustrated in FIGS. 1-4 and 5-9, there is illustrated a plug 30 which is of a unitary construction and is made from resilient rubber material. Plug 30 contains a hexagonal head portion 31 and a main body portion 32. The head portion 31 is solid and is configured to enable the plug to be turned or manipulated either by hand or with a tool. The main body portion 32 is hollow and therefore has an internal cylindrical bore 33 which extends from the head portion 31 to an open end. The cylindrical bore contains an internal tapered portion 34 adjacent the open end, and the external part of body portion 32 contains an external tapered portion 35.

Plug 13 can be of various sizes. Typically, plug 30 will have 12 main sizes. These sizes can be (the outer diameter of main body portion 32) 12 mm, 14 mm, 16 mm, 18 mm, 20 mm, 22 mm, 23 mm, 24 mm, 27 mm, 30 mm, 32 mm and 34 mm. Of course, no particular limitation should be placed on the invention merely by the exemplification of these precise sizes.

The plug as illustrated in FIGS. 1-4 is the "34 mm" plug. This particular plug has a head diameter of 40 mm (that is the distance across the hexagonal head). The thickness of the head portion is 34 mm. The length of the main body portion 32 is 30 mm. The outer diameter of the main body portion is 34 mm. The inner diameter is about 20 mm, and therefore the wall thickness is about 14 mm. The width of the external tapered portion 35 is 5 mm (approximately), and the width of the internal taper is about 8 mm. Of course, these sizes will vary depending on the size of the plug.

Figure 1:
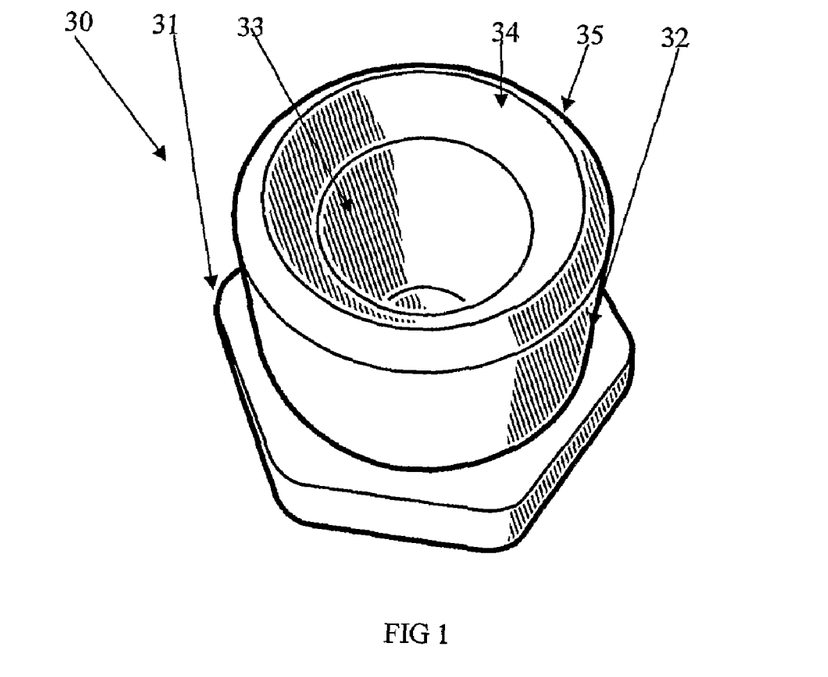
FIG. 1. Illustrates a bottom perspective view of a plug.
Figure 2:
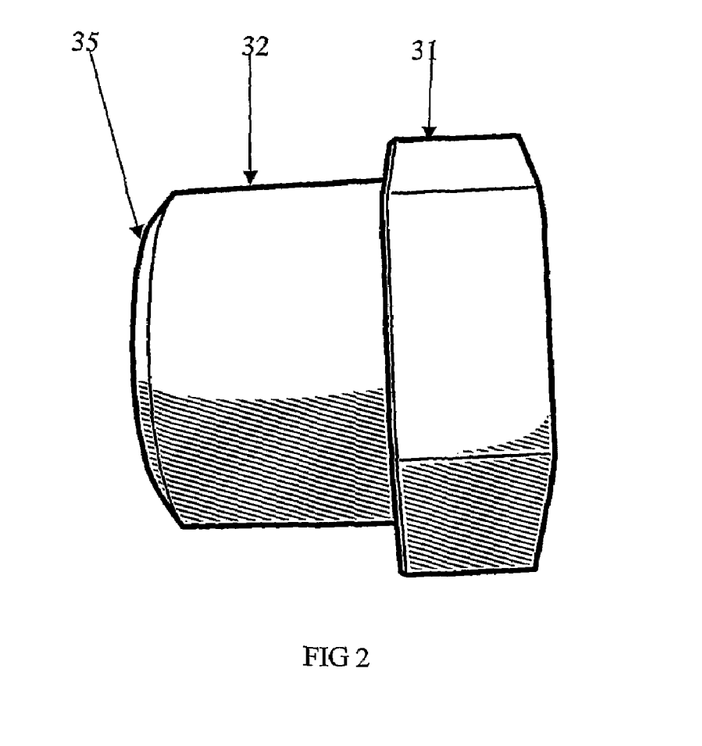
FIG. 2. Illustrates a side view of the plug of FIG. 1.
Figure 3:
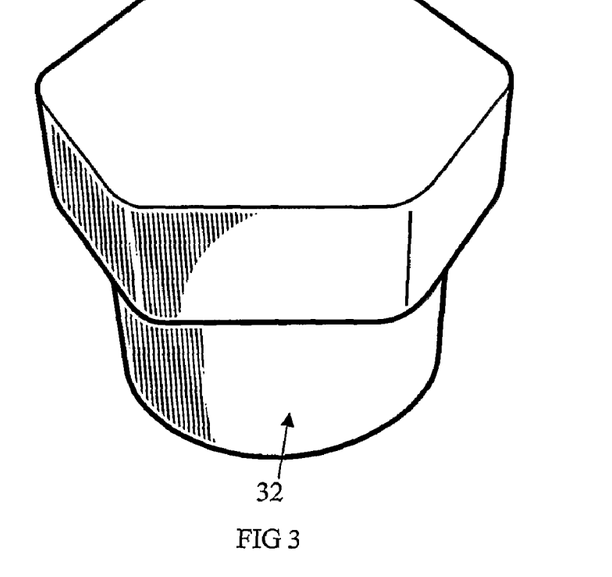
FIG. 3. Illustrates a top perspective view of the plug of FIG. 1.
Figure 4:
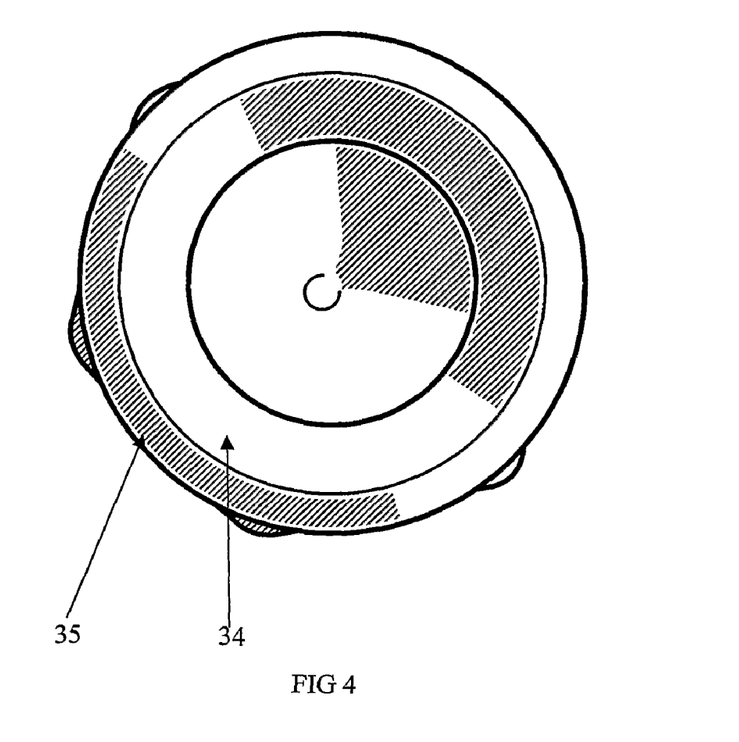
FIG. 4. Illustrates a bottom view of the plug of FIG. 1.
Figure 5:
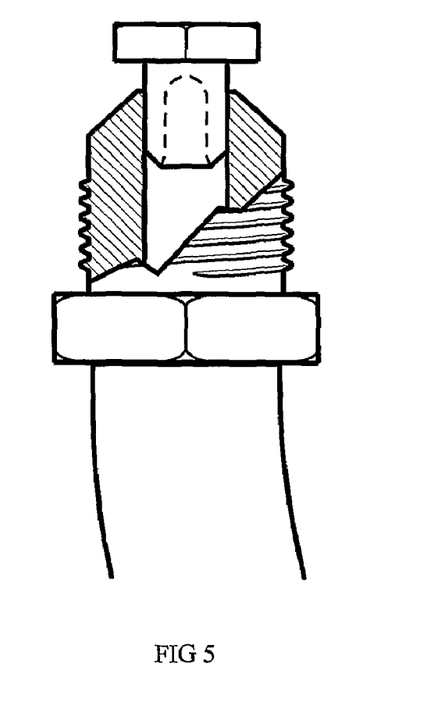
FIGS. 5-9. Illustrate the plug generally of FIGS. 1-4 attached to various hoses.
Figure 6:
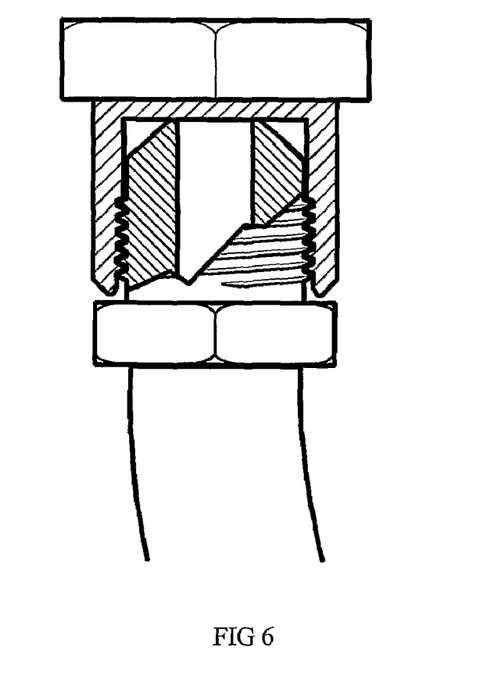
Figure 7:
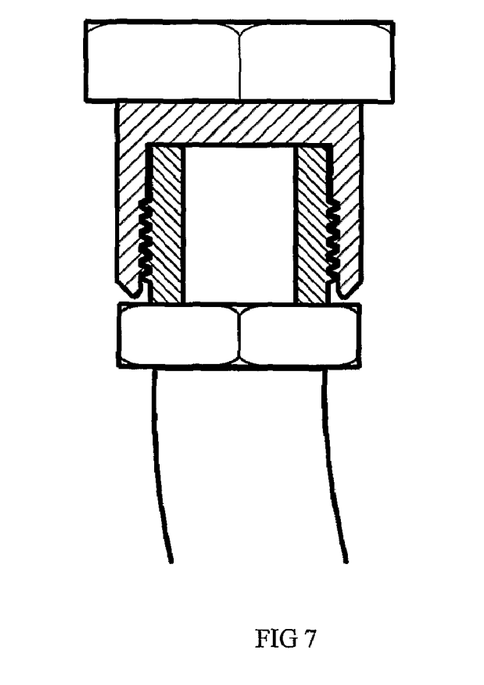
Figure 8:
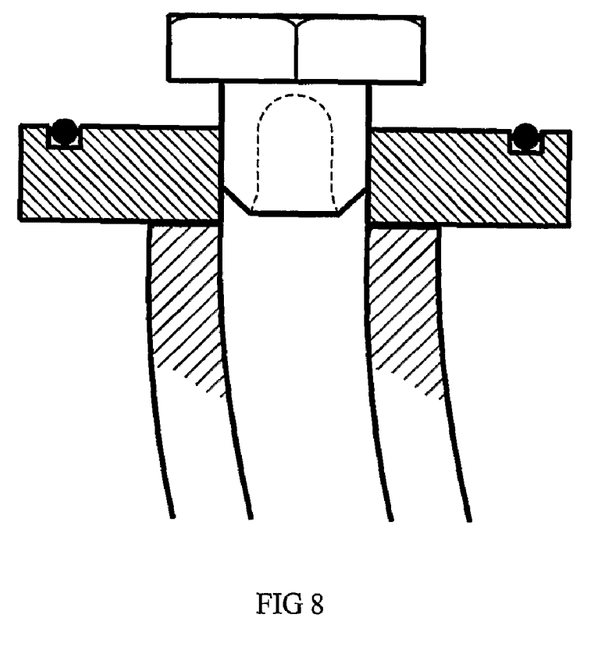
Figure 9:
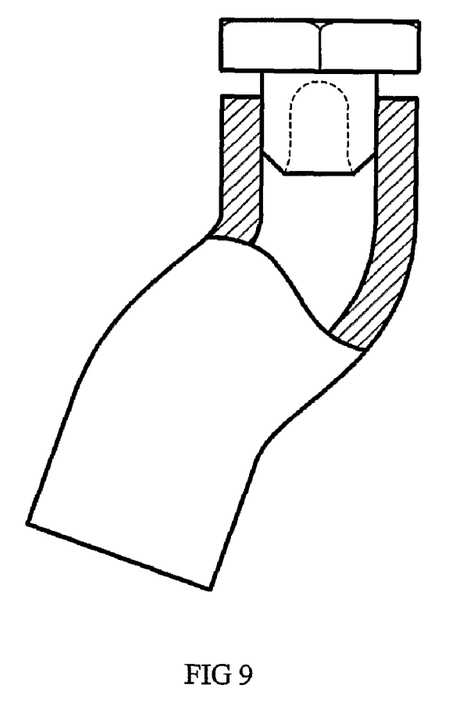

The configuration of this type of plug and enables it to be used as a male plug and a female plug, this being illustrated in FIGS. 5-9. Specifically, FIGS. 5, 8 and 9 show the plug being pushed into an opening in the (hydraulic) hose or pipe. FIGS. 6 and 7 show a plug of identical configuration (but larger size) being pushed over the top of a male hydraulic fitting. It should be appreciated that the plug of FIGS. 5-9 contains the internal bore which is not used, but where the internal bore is used when the same plug is used to cover a male hydraulic fitting as illustrated in FIGS. 6-7.

Figure 10:
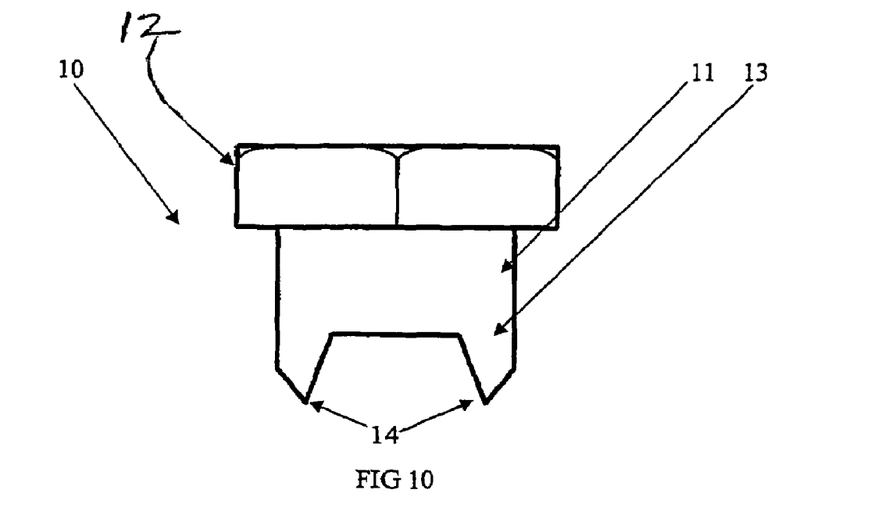
FIG. 10. Illustrates a plug for use with a female fitting and having a particular configuration of the head portion.
Figure 11:
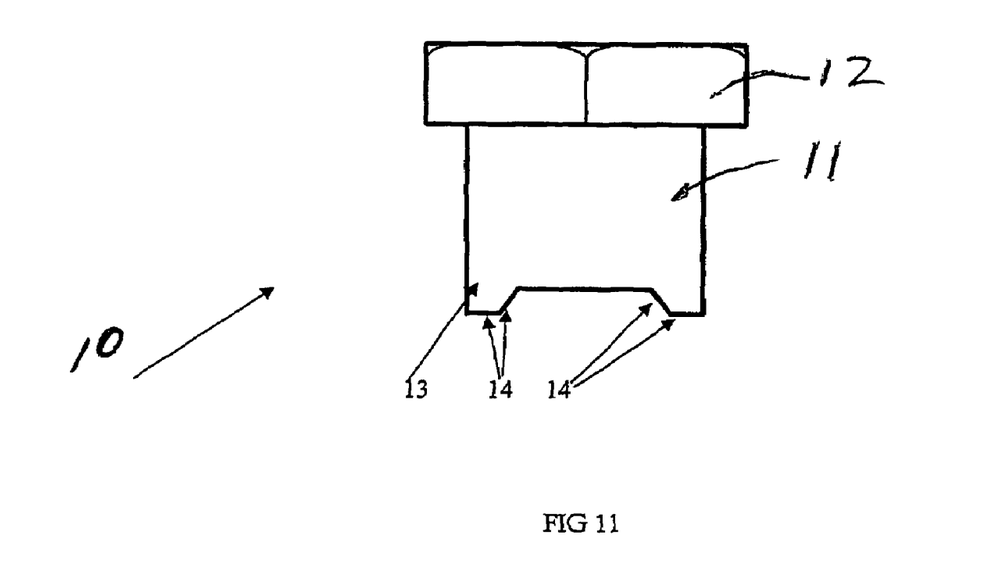
FIG. 11. Illustrates a plug similar to that of FIG. 10, except with a different configuration of the head portion.

Referring to the embodiment of the invention illustrated in FIGS. 10-11, it can be shown that a single type of plug (or relatively few different types of plugs) can be used many times in different types of female hydraulic fittings to provide a degree of sealing and therefore preventing leakage of hydraulic fluid.

Referring specifically to FIGS. 10-11, there is illustrated a plug according to a particular embodiment. The plug 10 in FIG. 10 (and the plug 11 in FIG. 11) comprises a solid rubber plug made from a compressible rubber material which is known as "Nitrile". The particular material is chosen to be fuel and oil tolerant. The plug 10 has a plug body 11, and comprises a head portion 12 (which is basically the end of plug body 11), and a tail portion 13 which is hexagonal to provide a hand grip to enable the plug to be pushed and rotated into a female fitting.

The plug is made of a single piece of material and therefore plug body 11 is formed integrally with the remainder of the plug. The size of the plug can vary but it is envisaged that the plug will have a width or diameter of between 10-40 millimetres and a length of between 10-40 millimetres. The length of the plug body 11 is designed to enable it to be pushed into the female fitting, this being illustrated in FIGS. 12-13 and in various other fittings.

In FIG. 10 and FIG. 11, the head portion 12 contains an annular ring 13 formed with a sealing surface 14 that presses up against the sealing surface in the female recess to enable the plug to be attached to the internal threads of the female fitting as well as providing a sealing action.

Figure 12:
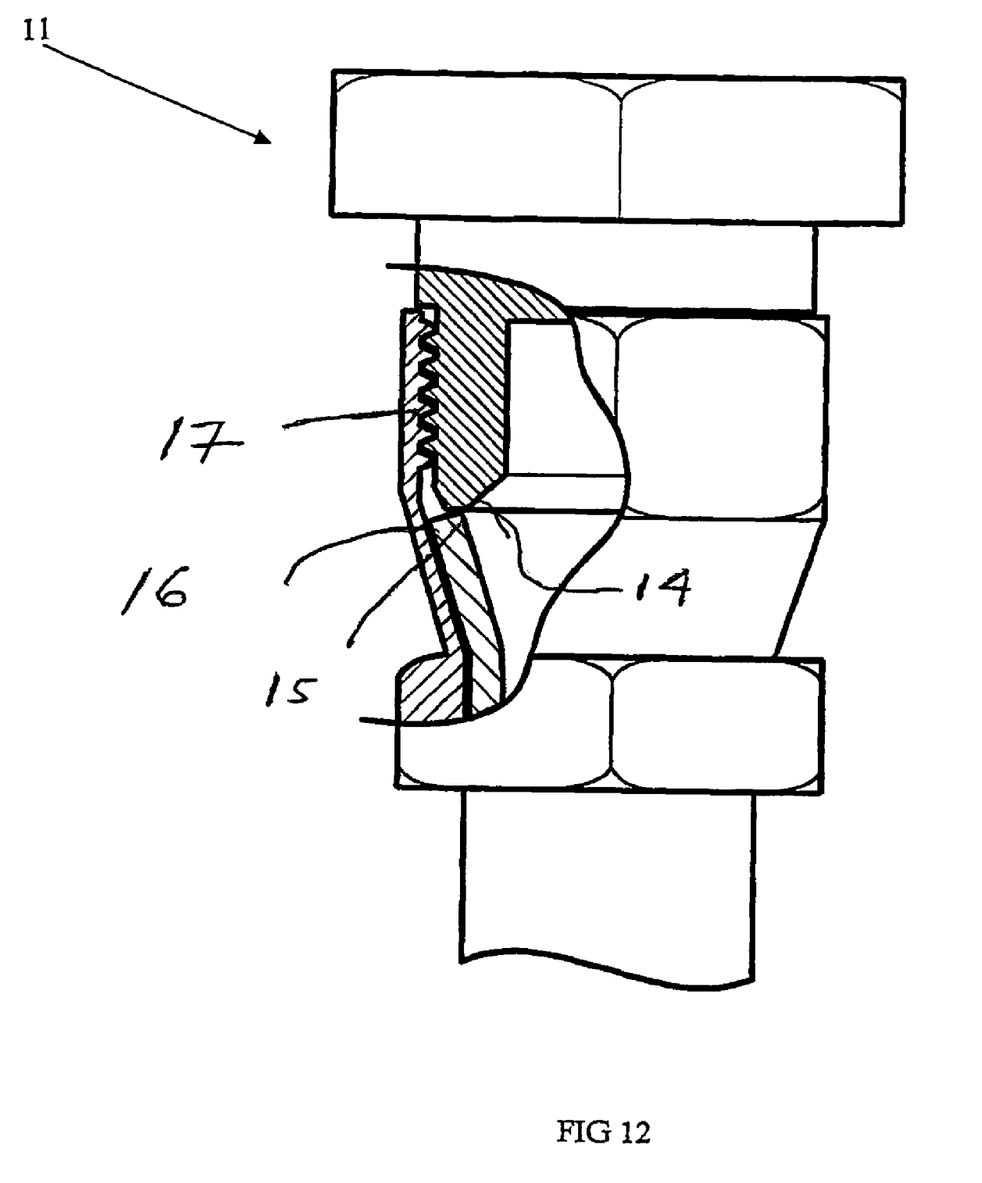
FIG. 12. Illustrates a part section view of a plug inserted into a particular type of female fitting, the fitting known as a JIC swivel fitting.

This is best illustrated in FIG. 12 which is a particular type of fitting (JIC fitting which is available in the Australian marketplace). In FIG. 12, the plug 11 of FIG. 11 has been pushed and rotated into the female fitting 16. The female fitting contains internal threads 17 and an innermost tapered seat 15. The compressible rubbery nature of the plug enables it to be pushed into and to grip the internal threads of the female fitting is illustrated in FIG. 12. Moreover, the sealing surface 14 of the plug abuts against and seals against the tapered seat 15 of the female fitting. Thus, the plug provides both a plugging and sealing action.

The plug can be removed from the female fitting by counter-rotation and pulling. When removed, the plug body 11 does not contain any permanent threads and this makes the plug suitable for use with different types of fittings that have different types of threads and different designs of internal sealing surfaces.

Figure 13:
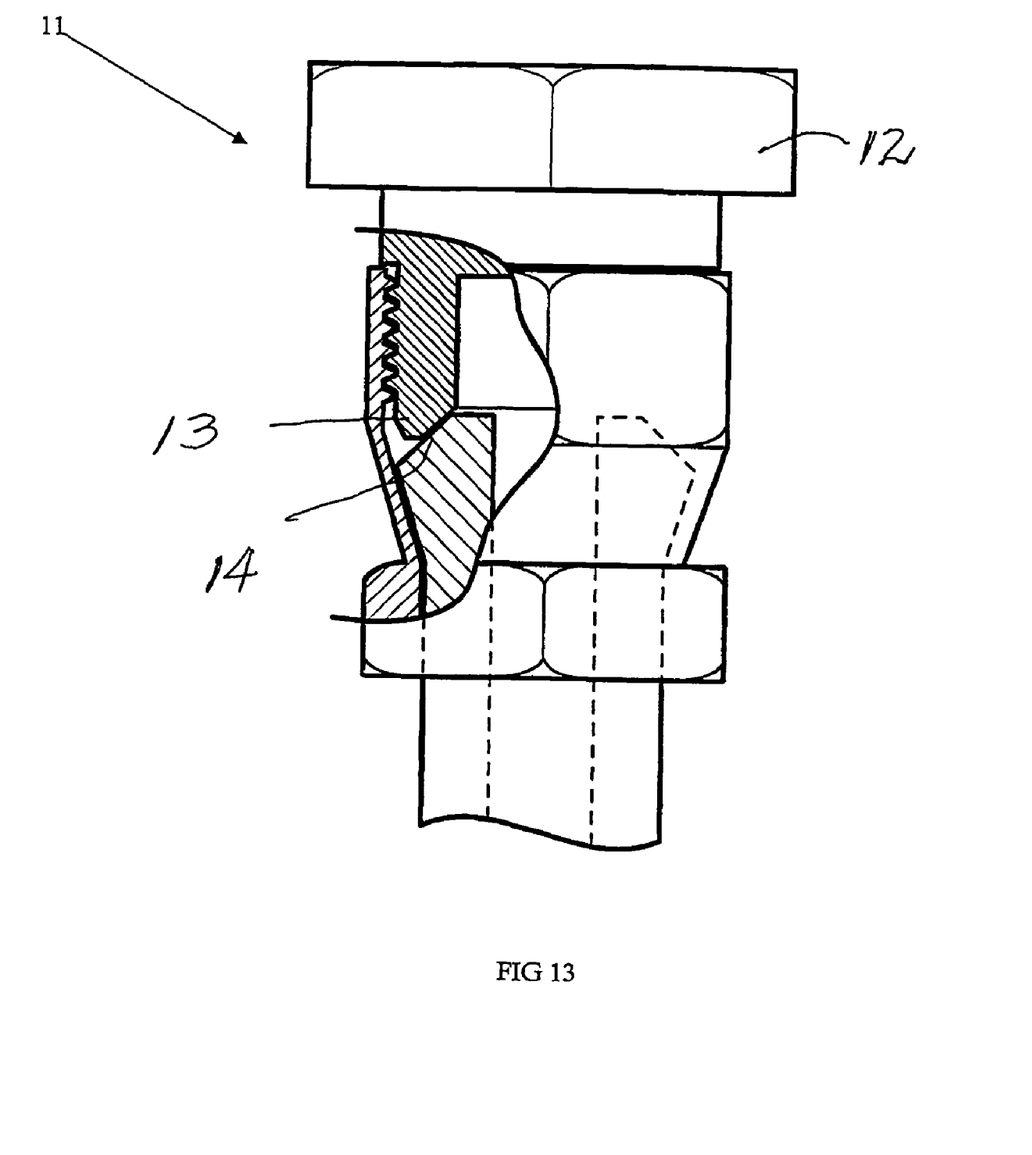
FIG. 13. Illustrates a part section view of a plug inserted into a different type of female fitting known as a BSP hydraulic swivel fitting.

As an example, FIG. 13 illustrates the same plug 11 which has now been fitted to a different type of female fitting, this being a BSP fitting which is known in the Australian marketplace. A different part of the annular sealing surface 14 now engages against part of the sealing surface of this particular fitting such that the same plug 10 can be used on the female fitting illustrated in FIG. 12 and in FIG. 13.

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

Throughout the specification and claims (if present), unless the context requires otherwise, the term "substantially" or "about" will be understood to not be limited to the value for the range qualified by the terms.

It should be appreciated that various other changes and modifications can be made to any embodiment described without departing from the spirit and scope of the invention.

I claim:

1. A method of plugging a hydraulic fitting, using a plug consisting of a head portion and an elastomeric body portion that is compressible and resilient, the head portion of greater dimension than the body portion to define an external shoulder portion between the head and body portions, the body portion being cylindrical and having an internal open ended bore which is also cylindrical, the open end of the body portion containing an external inwardly tapering sealing face adjacent the open end of the bore and an internal outwardly tapering portion within the bore adjacent the open end thereof, and adapted to seal both a male hydraulic fitting or a female hydraulic fitting to which the male hydraulic fitting corresponds, the method including the step of deforming the internal bore of the elastomeric body portion of the plug over the male hydraulic fitting such that an internal wall of the open ended bore of the plug seals against an external portion of the male hydraulic fitting when in use with a male fitting and deforming the body portion by pressing the body portion into an opening when in use with a female fitting in the female hydraulic fitting to seal the opening, thereby plugging the hydraulic fitting whether male or female.

2. The method of claim 1, wherein an internal bore of the fitting contains a tapered seat, and the plug is pushed into the internal bore such that the external tapered portion on the plug presses against the tapered seat of the fitting, without forming a thread in the plug.

3. The method as claimed in claim 1, wherein the elastomeric body portion of the plug is made of a nitrile rubber.

4. The method as claimed in claim 3, wherein the entire plug is made of nitrile rubber.

5. The method of claim 2, wherein the body portion of the plug used contains an annular ring formed with a sealing surface that, in use, presses up against a sealing surface in a female recess of the female hydraulic fitting to enable the plug to be attached to internal threads of the female hydraulic fitting, as well as providing a sealing action.

6. The method of claim 1, wherein the internal outwardly tapering sealing face in the bore of the plug is several times greater in size than the external inwardly tapering sealing face adjacent the open end of the bore.

* * * * *